UNITED STATES PATENT OFFICE.

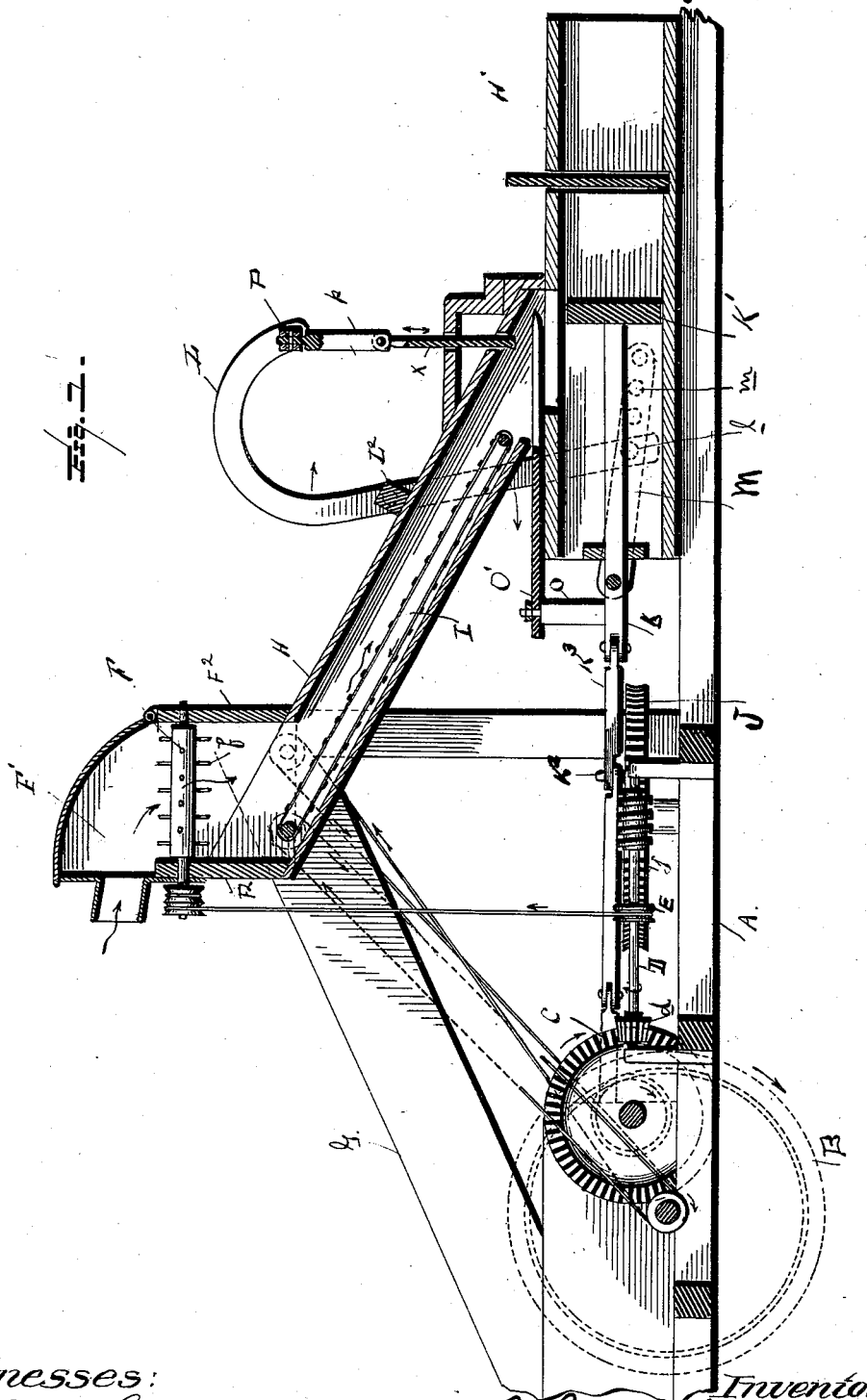

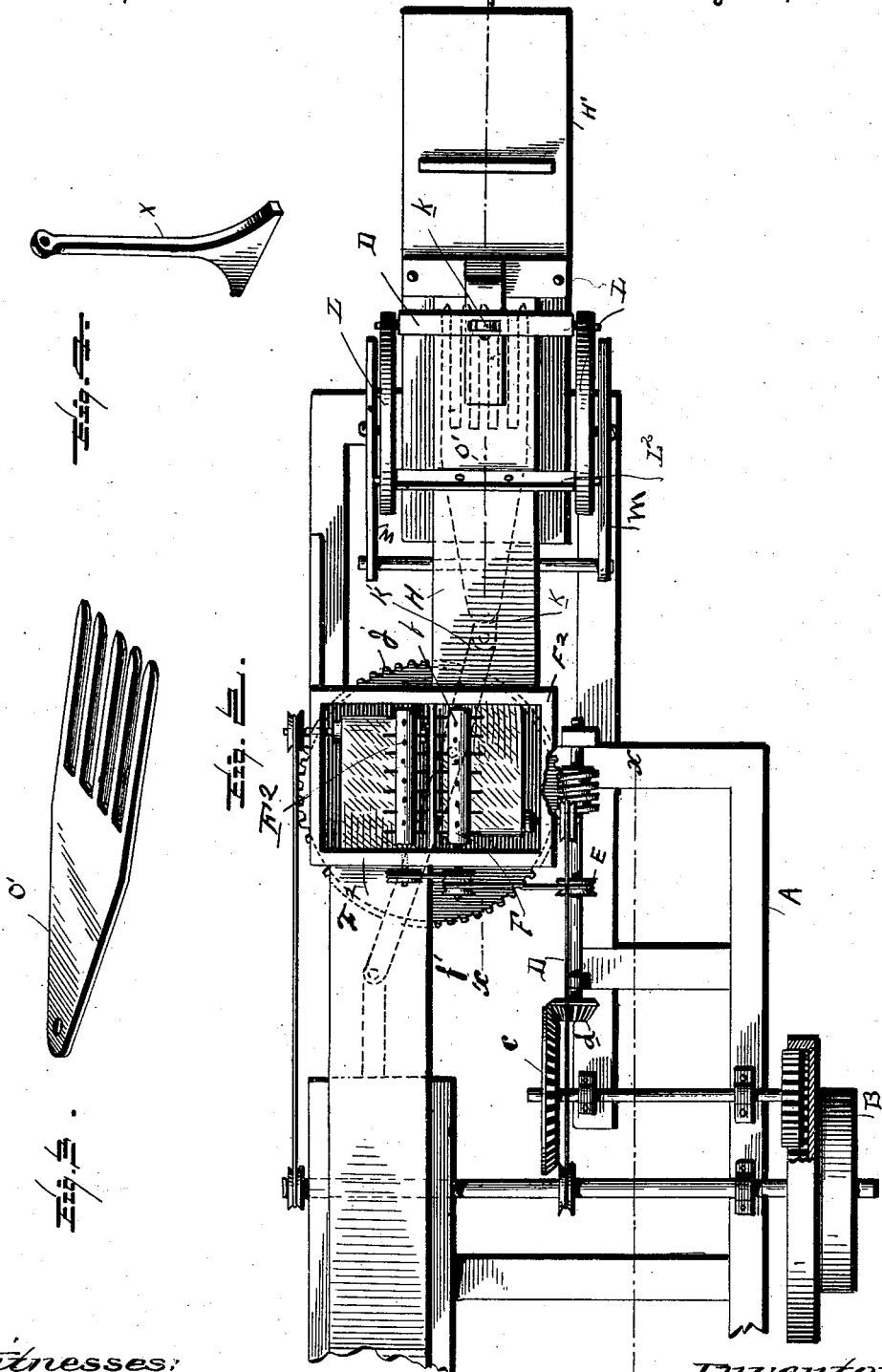

JOHN M. WASHBURN, OF ATTICA, INDIANA.

BALING-PRESS.

SPECIFICATION forming part of Letters Patent No. 543,278, dated July 23, 1895.

Application filed February 4, 1895. Serial No. 537,297. (No model.)

*To all whom it may concern:*

Be it known that I, JOHN M. WASHBURN, a citizen of the United States, residing at Attica, in the county of Fountain and State of Indiana, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in baling-presses, and especially an invention of this nature which may be attached to a straw-carrier of a thrashing-machine to bale the same as it comes from the thrasher, it being my purpose to have two presses running by the same power and a divider to separate the straw, carrying an equal amount to the two presses, so that all of the straw may be handled without any accumulations, thus enabling the presses to keep up with the thrashing-machine.

A further object of the invention resides in mechanism for preventing the straw getting behind the follower as the latter is drawn back to receive a supply to be pressed, and in an automatic feeder whereby the straw being conveyed by the elevator is allowed to be discharged into the press and prevented from entering the press when the follower is drawn back to its farthest limit.

To these ends and to such others as the invention may pertain, the same consists, further, in the novel construction, combination, and adaptation of the parts as will be hereinafter more fully described, and then specifically defined in the appended claim.

I clearly illustrate my invention in the accompanying drawings, which, with the letters of reference marked thereon, form a part of this specification, and in which drawings similar letters of reference indicate like parts, in which—

Figure 1 is a sectional view on the lines $x\ x$ and $x\ x$ of Fig. 2. Fig. 2 is a top plan view; Fig. 3, a detail view of the fork for preventing the straw getting behind the follower. Fig. 4 is a detail view of the feeder.

Reference now being had to the details of the drawings by letter, A designates the main frame supporting the presses, designed to be mounted on a suitable truck; B, the driving-wheel receiving-power, preferably from the thrashing-machine, to which the invention is adapted to be attached.

C is a gear-wheel communicating motion from the main driving-wheel to the longitudinally-journaled worm-shaft D through the medium of the pinion $d$. The said shaft D carries the pulley E, which communicates motion to the divider-roller F by belt connection, the said roller being provided with a series of teeth $f$.

$F^2$ is a second divider-roller which is revolved in a reverse direction from that of the roller F, and is connected by belt $f'$ to the said roller F. These divider-rollers are adapted to divide equally, or substantially so, the supply of straw to the conveyers G and H, each leading to a press, only one of which is shown, H'. The said dividers are mounted in a receiving-box, and turning in opposite directions throw the straw in two directions.

I is an endless carrier, which carries the straw to the press, having belt connections with the main driving-shaft.

J is a vertically-journaled wheel which is provided with peripheral teeth $j$, which engage with the threaded worm on the shaft D. This wheel J has pivoted to a lug $K^2$ the rod $K^3$, connected to the rear end of the follower $k$, causing the same to be reciprocated as the said wheel revolves.

L is a rod secured to a cross-bar $L^2$ on the box H at right angles to the follower, and at its ends it is connected to the reciprocating adjustable rods M, which are held to the rocking levers L by the pins $l$.

O is a vertical post carried by the follower and its upper end is connected to the forked member O', which is caused to reciprocate back and forth in the press-box, being held directly above the plunger-head to prevent the straw falling behind the head K' of the follower as the same is withdrawn.

P is a cross-bar pivoted to the upper free ends of the rocking levers L, and carries at its center the bifurcated rod $p$, which carries at its lower end the feeder or packer X, which, as the said levers rock, is caused to raise and lower, being in its lowest position when the follower is drawn back to its limit.

It is my purpose to provide two presses similarly constructed, and each to receive power to reciprocate their plungers from the same wheel J, although in my drawings I show but one.

Having thus described my invention, what I claim to be new, and desire to secure by Letters Patent, is—

In combination in a baling press, the two dividing rollers journaled in the walls $F^2$, means for revolving same in opposite directions, a conveyer box, an endless carrier traveling over rollers one of which is journaled underneath said dividing rollers, the other adjacent to the lower end of said conveyer box, the press box, the adjustable levers L pivoted near their centers to a cross-bar $L^2$, the follower bars M having a series of apertures $m$, each bar connected at one end to the follower shaft $k$, at its other end to the lower portion of said lever L, and the feeder X pivoted to a shaft $p$, carried by the cross bar P journaled in the upper depending ends of the levers L, and means for operating the device, substantially as shown and described.

In testimony whereof I affix my signature in presence of two witnesses.

JOHN M. WASHBURN.

Witnesses:
KEMPER AHRENS,
J. SHANNON LOVE.